United States Patent
Coha et al.

[11] Patent Number: 5,431,047
[45] Date of Patent: Jul. 11, 1995

[54] FLOAT LEVER ASSEMBLY

[75] Inventors: Timothy F. Coha, Davison; Ulf Sawert; William S. Zimmerman, both of Grand Blanc, all of Mich.

[73] Assignee: General Motors Corporation, Detroit, Mich.

[21] Appl. No.: 150,317

[22] Filed: Nov. 12, 1993

[51] Int. Cl.⁶ .................. G01F 23/32; G01F 23/76
[52] U.S. Cl. ................................ 73/317; 73/322.5
[58] Field of Search .............. 73/317, 322.5, 305; 116/229

[56] References Cited

U.S. PATENT DOCUMENTS

| | | |
|---|---|---|
| 704,442 | 7/1902 | Doellinger ................ 73/317 |
| 1,231,300 | 6/1917 | Ritz-Woller .............. 73/317 |
| 1,391,347 | 9/1921 | Stanfa . | 
| 1,902,933 | 3/1933 | Zubaty . |
| 2,266,298 | 12/1941 | Bacon ..................... 73/317 |
| 2,508,290 | 5/1950 | Poetsch .................... 201/48 |
| 3,202,173 | 8/1965 | Szwargulski .............. 73/322.5 |
| 3,289,477 | 12/1966 | Taylor et al. ............. 73/322.5 |
| 3,320,807 | 5/1967 | Taylor et al. ............. 73/322.5 |
| 3,449,955 | 6/1969 | Stadelmann ............... 73/313 |
| 4,114,130 | 9/1978 | Sutton et al. ............. 338/33 |
| 4,706,707 | 11/1987 | Betterton et al. ........ 137/565 |
| 4,928,526 | 5/1990 | Weaver ..................... 73/313 |
| 4,945,884 | 8/1990 | Coha et al. ............... 123/509 |

Primary Examiner—William A. Cuchlinski, Jr.
Assistant Examiner—Willie Morris Worth
Attorney, Agent, or Firm—Saul Schwartz

[57] ABSTRACT

A float lever assembly for a fuel sender in a fuel tank of a motor vehicle includes a urethane float having a flat passage therein, a metal wire float lever attached to a pivot arm of a transducer of the fuel sender, and a bayonet connector formed integrally on the end of the float lever. The bayonet connector includes an inner leg, a relatively shorter outer leg, and a knee therebetween. The bayonet connector has a span dimension which exceeds a width dimension of the passage in the float so that when the bayonet connector is plugged into the passage, a tip on the outer leg of the connector bears against a side wall of the passage and defines a barb which prevents dislodgement of the bayonet connector from the passage.

2 Claims, 1 Drawing Sheet

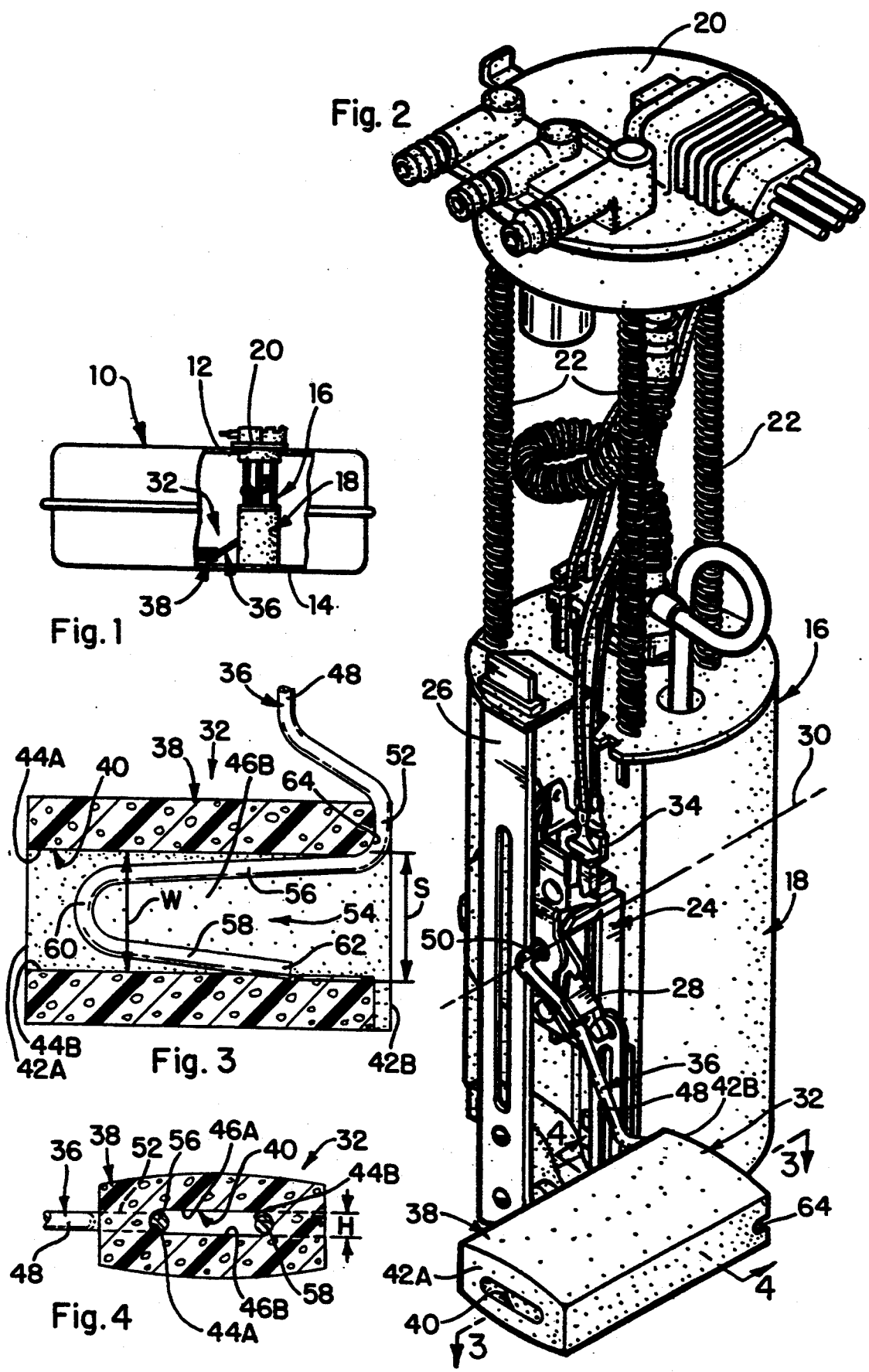

FLOAT LEVER ASSEMBLY

FIELD OF THE INVENTION

This invention relates to apparatus for monitoring the quantity of fuel in a fuel tank of a motor vehicle.

BACKGROUND OF THE INVENTION

U.S. Pat. No. 4,845,884, issued 7 Aug. 1990 and assigned to the assignee of this invention, describes a modular fuel sender mounted inside a fuel tank of a motor vehicle. The fuel sender includes a reservoir which is spring biased against a bottom wall of the fuel tank, a transducer mounted on the reservoir, and a float lever assembly connected to the transducer. The float lever assembly includes a metal wire float lever and a closed cell urethane float captured on a distal end of the float lever between a portion of the lever bent perpendicular to the distal end and a "PALNUT" press fitted on the distal end outboard of the float. A float lever assembly according to this invention is an improvement relative to the float lever assembly described in the aforesaid U.S. Pat. No. 4,845,884.

SUMMARY OF THE INVENTION

This invention is a new and improved float lever assembly for a modular fuel sender in a fuel tank of a motor vehicle, the fuel sender including a reservoir in the fuel tank and a transducer mounted on the reservoir. The float lever assembly is connected to a pivot arm of the transducer such that the transducer provides an electrical signal corresponding to the angular position of the float lever assembly relative to a horizontal axis of the reservoir. The float lever assembly according to this invention includes a wire float lever connected to the pivot arm of the transducer, a closed cell urethane float having a wide, flat passage therethrough defining a socket, and an integral flat bayonet connector at the distal end of the float lever which plugs into and is self-retaining in the socket in the float. The bayonet connector is defined by a reverse bend at the end of the float lever and includes an inboard leg, a relatively shorter outboard leg, and a resilient knee between the inboard and outboard legs. When the connector is plugged into the socket defined by the flat passage in the float, the inboard and outboard legs are flexed at the knee toward each other so that when the bayonet connector achieves a fully seated position in the passage, a tip of the outboard leg is biased against a side of the passage for penetration into the float to prevent dislodgement of the float from the float lever.

BRIEF DESCRIPTION OF THE DRAWINGS

FIG. 1 is a partially broken-away view of a motor vehicle fuel tank having mounted therein a modular fuel sender including a float lever assembly according to this invention;

FIG. 2 is an enlarged perspective view of a portion of FIG. 1;

FIG. 3 is a sectional view taken generally along the plane indicated by lines 3—3 in FIG. 2; and FIG. 4 is a sectional view taken generally along the plane indicated by lines 4—4 in FIG. 2.

DESCRIPTION OF A PREFERRED EMBODIMENT

Referring to FIGS. 1-2, a fuel tank 10 of a motor vehicle, not shown, has a top wall 12 and a bottom wall 14. A modular fuel sender 16 mounted inside the tank includes a reservoir 18 having a fuel pump, not shown, therein, a cover 20, and a plurality of resilient struts 22. The modular fuel sender 16 may be as described in the aforesaid U.S. Pat. No. 4,845,884 and is mounted in the fuel tank such that the cover 20 closes an access opening in the top wall 12 of the tank and the struts 22 bias the reservoir agasint the bottom wall 14 of the tank.

A transducer 24 of conventional construction is mounted on a vertical metal support 26 attached to the reservoir 18 and includes a pivot arm 28 rotatable about a horizontal axis 30 of the reservoir. A float lever assembly 32 according to this invention is attached to the pivot arm 28 and establishes an angular position of the pivot arm in accordance with the level of the surface of the pool of fuel in the fuel tank. The transducer 24 provides an electrical signal through a wiring harness 34 corresponding to the angular position of the pivot arm 28 about the horizontal axis 30.

As seen best in FIGS. 2–4, the float lever assembly 32 includes a metal wire float lever 36 and a float 38. The float 38 is a generally rectangular element molded from closed cell urethane which floats on the surface of the pool of fuel in the fuel tank. The float has a flat passage 40 molded therein which opens through a pair of opposite end walls 44A-B of the float. Inside the float, the passage is bounded by a pair of narrow sides 42A-B and by a pair of wide sides 46A-B. The passage has a width dimension "W" between the sides 44A-B and a height dimension "H" between the wide sides 46A-B.

The float lever 36 is made of metal wire of a diameter corresponding generally to the height dimension of the passage 40, preferably on the order of about 3.0 mm diameter, and includes a shank portion 48 and an inboard end 50 bent generally perpendicular to the shank portion. The inboard end 50 is received in an aperture in the transducer 24 aligned on the axis 30. A clip on the pivot arm 28 clamps the shank portion 48 of the float lever to the pivot arm whereby the float lever 36 is rotatable as a unit with the pivot arm about the horizontal axis 30.

The float lever 36 further includes a distal end 52 and an integral bayonet connector 54. The bayonet connector 54 is formed by bending the float lever 36 outboard of the distal end 52 to define an inner leg 56 adjacent the distal end, a relatively shorter outer leg 58, and an integral round knee 60 between the inner and outer legs. The inner and outer legs 56-58 are disposed in a common plane, FIG. 4, which may also include the shank portion 48 of the float lever. When the inner and outer legs are undeflected, the bayonet connector 54 has a span dimension "S" in the plane of the inner and outer legs between a tip 62 of the outer leg and the base of the inner leg where the latter merges with the distal end 52 which slightly exceeds the width dimension "W" of the passage 40.

The float 38 is attached to the float lever 36 by plugging the bayonet connector 54 into a socket in the float defined by the passage 40. The bayonet connector is introduced into the passage 40 through the intersection thereof with the end wall 42B. The convex side of the rounded knee 60 effectively centers the bayonet connector in the passage and the slight interference between the span dimension of the connector and the width of the passage 40 initiates slight flexure of the inner and outer legs 56,58 about the knee 60 as the connector penetrates the passage.

A fully seated position of the bayonet connector 54 in the passage 40, FIG. 3, is defined by engagement of the distal end 52 of the float lever in a groove 64 in the end wall 42B of the float. In the fully seated position, inner and outer legs 56,58 are slightly flexed so that the tip 62 of the outer leg is biased agasint the narrow side 44B of the passage. In that circumstance, the tip 62 defines a barb which penetrates or digs into the urethane float to prevent dislodgement of the bayonet connector from the passage through the end wall 42B of the float.

As seen best in FIGS. 3-4, the inner and outer legs 56,58 are closely captured between the wide sides 46A-B of the passage 40 so that float is not rotatable relative to the float lever. In addition, if it is desired to reduce or eliminate twisting of the shank portion 48 of the float lever, the distal end 52 of the float lever may be formed in goose-neck fashion, FIG. 3, to align the center of buoyancy of the float more closely with the centerline of the shank portion.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a fuel sender in a fuel tank of a motor vehicle including a transducer mounted in said fuel tank with a pivot arm of said transducer rotatable about a horizontal axis, a float lever assembly comprising:

a wire float lever having an inboard end attached to said pivot arm of said transducer for rotation as a unit therewith about said horizontal axis, an integral bayonet connector on a distal end of said float lever opposite said inboard end including an inner leg perpendicular to said distal end of said float lever, a relatively shorter outer leg having a tip at an end thereof facing said distal end of said float lever, and a knee resiliently interconnecting said inner and said outer legs, said tip of said outer leg being spaced from said inner leg by a span dimension of said bayonet connector in an undeflected condition of said bayonet connector, a closed cell urethane float having a pair of opposite end walls, and a passage in said float opening through one of said pair of end walls thereof and bounded internally of said float by a pair of side walls separated by a width dimension of said passage which is less than said span dimension of said bayonet connector so that when said bayonet connector is plugged into said passage through said one end wall to a fully seated position defined by engagement of said one end wall against said distal end of said float lever said tip of said outer leg penetrates one of said pair of side walls of said passage so that said tip and said distal end cooperate to positively prevent movement of said bayonet connector relative to said float out of said fully seated position.

2. The float lever assembly recited in claim 1 wherein said float lever is made from round metal wire having a predetermined diameter, and a height dimension of said passage in said float corresponds generally to said diameter of said wire of said float lever so that in said fully seated position of said bayonet connector in said passage said bayonet connector is captured on four sides by said passage.

* * * * *